No. 649,041. Patented May 8, 1900.
T. P. & G. E. BURGESS.
APPARATUS FOR SUBJECTING LIQUIDS TO GASES.
(Application filed Oct. 23, 1899.)
(No Model.)
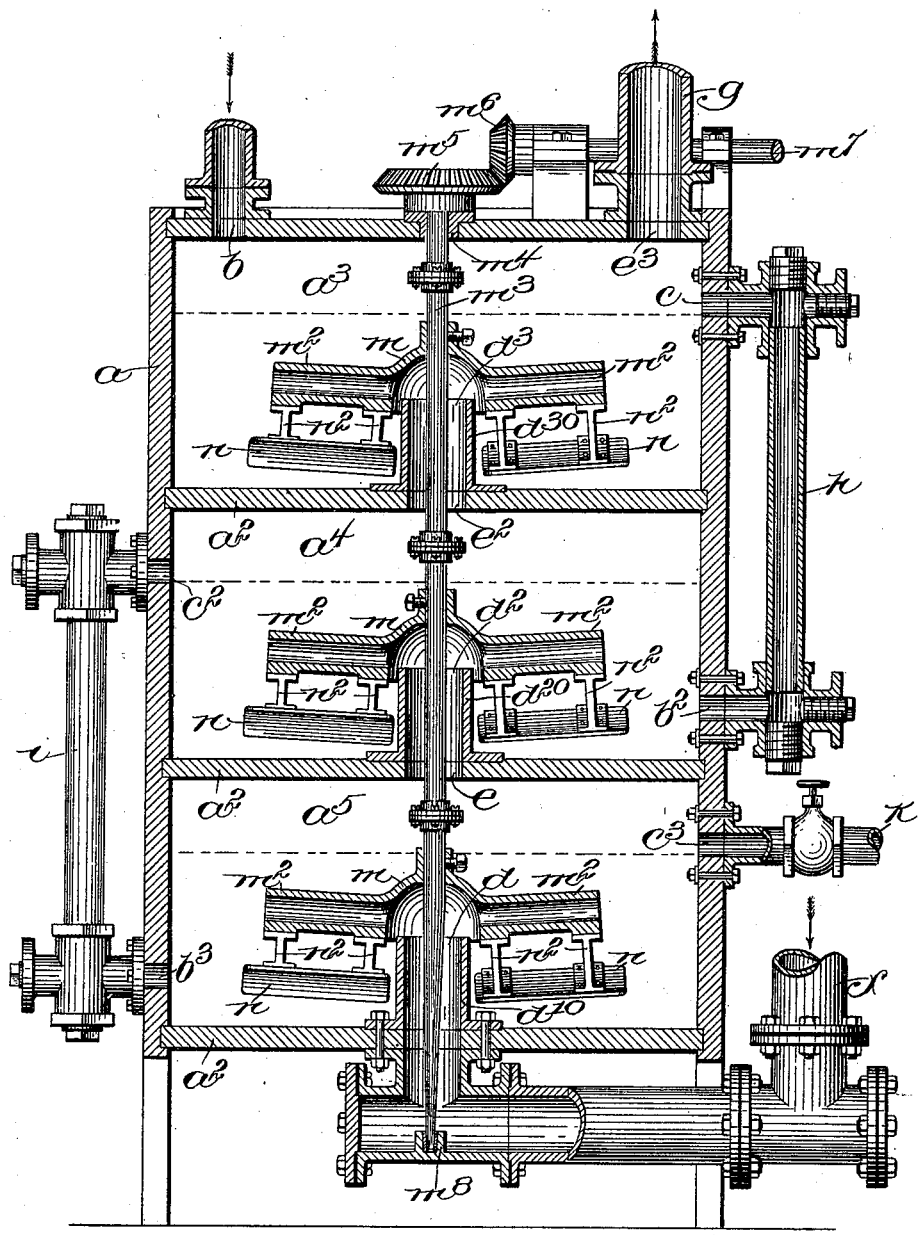
Witnesses:
Jas. J. Maloney.
Nancy P. Ford.
Inventors:
Theodore P. Burgess
and George E. Burgess,
by J. P. and H. Livermore
attys

UNITED STATES PATENT OFFICE.

THEODORE P. BURGESS AND GEORGE E. BURGESS, OF BERLIN, NEW HAMPSHIRE, ASSIGNORS TO SAID THEODORE P. BURGESS.

APPARATUS FOR SUBJECTING LIQUIDS TO GASES.

SPECIFICATION forming part of Letters Patent No. 649,041, dated May 8, 1900.

Application filed October 23, 1899. Serial No. 734,458. (No model.)

*To all whom it may concern:*

Be it known that we, THEODORE P. BURGESS and GEORGE E. BURGESS, of Berlin, county of Coos, and State of New Hampshire, have invented an Improvement in Apparatus for Subjecting Liquid to the Action of Gas, of which the following description, in connection with the accompanying drawing, is a specification, like letters on the drawing representing like parts.

The present invention relates to an apparatus for subjecting liquids to the action of gas, as in producing bisulfite of lime, the object of the invention being to obtain an apparatus of large capacity which will occupy a comparatively-small space and will be capable of resisting to the greatest extent the detrimental effect of the acids.

The process of making bisulfite of lime, for which the apparatus is especially intended, consists in subjecting lime and magnesia-water or "milk of lime," as it is usually called, to the action of sulfurous gas, the gas being sucked up by atmospheric pressure through the liquid and the amount of gas and liquid so proportioned that the gas used will be combined with the liquid in proper proportions to convert said liquid into bisulfite of lime.

It has been customary heretofore to employ a series of separate tanks, at least three in number, the said tanks being on different levels and connected together by pipes for the gas and pipes for the liquid, the pipes for the gas entering from below and the pipes for the liquid extending from a suitable overflow-point in the side wall of each tank to a point below the level in the tank next below. The gas is then sucked by any suitable vacuum-producing means through all of the tanks successively, beginning with the bottom tank and ending with the top tank, and the liquid is pumped into the top tank and thence overflows into the tanks below and out of the bottom tank, the gas passing through the liquid in the several tanks and combining therewith to form the bisulfite in the lowest tank. This arrangement not only takes up a great deal of valuable space, but also requires a large amount of piping, which is rapidly attacked by the acid, so that the life of the apparatus is comparatively short and repairs expensive, and said pipes also frequently become clogged by deposits of lime.

It is the main object of the present invention to economize the space occupied by the apparatus, to reduce the amount of piping, and to increase the efficiency of the apparatus.

To these ends the apparatus embodying the invention consists of a single tank divided by horizontal partitions into preferably three compartments, one above the other, each partition being provided with an opening to afford a continuous passage for gas throughout the tank. The apparatus is further provided with a continuous passage for liquid, each compartment being connected by a pipe to the compartment next below, the said pipes extending substantially vertically down the side of the tank, so that a minimum amount of piping will answer the purpose. The ingress end of each pipe for liquid is substantially above the bottom of the compartment from which the said pipe receives liquid, so that in the operation of the apparatus a large amount of liquid is contained in the compartment above the opening through which the gas enters, the said opening being submerged and the gas sucked up through the liquid by means of any suitable vacuum-producing means. The apparatus is further provided with a distributing device for each chamber located over the opening for gas, the said distributing devices being arranged to operate mechanically and to thoroughly distribute the gas throughout the liquid. The several openings for gas may be arranged in alinement with each other and the several distributing devices connected with a common operating-shaft extending through the tank lengthwise and passing through the several openings for gas, which are below the top of the tank.

While it is practicable to utilize a simple hole or opening in each partition for the gas-passage, the efficiency of the apparatus may be greatly increased by providing each opening with an upwardly-extending tube or duct, the end of which terminates below the egress end of the pipe for liquid. The head or pressure to be overcome is thus reduced to the head represented by the depth of liquid above the end of the tube. To insure a thorough permeation of the liquid by the gas when this construction is used, each compartment is provided with means for producing upward currents of liquid toward the incoming gas, the said means being shown as movable paddles or stirring devices so shaped as to continually produce an upward current or currents, thus raising the liquid in upward currents and mixing it with the gas by means of said agitators in preference to the old way of passing the gas down into the bottom of the compartment by means of a correspondingly-higher vacuum produced by a pump or otherwise.

The drawing is a vertical section of an apparatus embodying the invention.

The said apparatus is shown as comprising a tank $a$, divided by means of horizontal partitions $a^2$ into three compartments $a^3$, $a^4$, and $a^5$, said compartments having inlets $b$ $b^2$ $b^3$ and outlets $c$ $c^2$ $c^3$ for the liquid and inlets $d$ $d^2$ $d^3$ and outlets $e$ $e^2$ $e^3$ for the gas. The outlets $c$ $c^2$ $c^3$ for the liquid are above the bottoms of the several compartments, so that liquid will be retained in each compartment to receive the action of the gas, which enters at or near the bottom of each compartment, passing upward through the liquid and escaping through the outlet for the gas at or near the top of each compartment. The inlet $d$ to the lowermost compartment is connected, as by a pipe $f$, with a source of gas, and the outlet $e^3$ from the uppermost compartment is connected, as by a pipe $g$, with a vacuum-pump, (not herein shown,) so as to cause a flow of gas through the liquid. The outlet $e$ from the lowermost compartment opens directly into the middle compartment, and the same passage or opening thus constitutes the outlet $e$ from one compartment and the inlet $d^2$ to the other. The same is true of the middle compartment and the uppermost compartment, it being obvious, therefore, that each compartment has an inlet communicating with a source of gas and an outlet for said gas communicating with the vacuum-chamber, so that the gas will flow through each compartment and act on the liquid therein.

To prevent the gas from escaping through the inlets for the liquid, the said inlets to the middle and lowermost compartments are below the liquid-level determined by the position of the outlet for the liquid, it being immaterial, however, what the position of the inlet for the liquid to the uppermost compartment is, since no gas can escape therethrough without having previously acted on all the liquid contained in the apparatus. As herein shown, the excess of liquid in the uppermost compartment is arranged to overflow into the middle compartment, the outlet $c$ being connected by a pipe $h$ with the inlet $b^2$. Similarly the excess of liquid in the middle compartment overflows into the lowermost compartment through a pipe $i$, connecting the outlet $c^2$ with the inlet $b^3$, while the finished product passes through the outlet $c^3$, which has a pipe $k$ leading to a suitable receiver. (Not shown.)

The size of the several inlets for the gas is so proportioned with relation to the volume of gas passing through the several compartments that when the suction-pump is started the gas-pressure at each inlet will be sufficient to prevent the liquid from running down through said inlets, so that substantially the only outflow of the liquid is by way of the outlet-passages arranged for the purpose.

To insure an even distribution of the gas throughout the liquid, each compartment is shown as provided with a distributing device comprising a dome $m$, provided with radially-projecting pipes $m^2$, the said device being situated directly over the inlets for the gas, so as to receive and deflect the gas by means of its pipes throughout the liquid in which the said device is submerged. The said distributing devices are shown as connected with a vertical shaft $m^3$, having a suitable bearing $m^4$, the said shaft being arranged to be rotated in any suitable or usual way, as by means of beveled gears $m^5$ and $m^6$, the latter being connected with the driving-shaft $m^7$. To prevent the said shaft $m^3$ from swaying laterally, its lower end may be engaged in a footpiece $m^8$, as shown.

To reduce the pressure or head which has to be overcome by the suction in order to produce a continuous flow of gas throughout the apparatus, each compartment is shown as provided with an upwardly-projecting tubular passage or duct at its inlet, the said ducts being indicated by the reference-letters $d^{10}$, $d^{20}$, and $d^{30}$. It is obvious that by this arrangement the head or pressure to be overcome is represented by the distance between the inlet ends of said tubular inlet-passages and the level of the liquid in the several compartments, which is obviously much less than the distance between the said level and the bottoms of the compartments. The gas, however, enters the compartments at some distance from the bottoms thereof, and to insure the proper distribution of the gas throughout the liquid the several compartments are provided with means for continually carrying or lifting the liquid up into the path of the gas. For this purpose each compartment is provided with an agitator or stirring device arranged to produce an upward current continually flowing into the path of the gas which enters through the distributing devices. The said stirring devices are herein shown as blades or paddles $n$, connected with the distributing devices and adapted to be rotated therewith, the said blades being inclined upward from front to back in the direction of their travel, so as to continually lift up the liquid and insure that every part thereof is subjected to the action of the gas. The said blades $n$ are herein shown as connected by suitable supports $n^2$ with the pipes $m^2$, and are thus driven by the shaft $m^3$.

While, as has been hereinbefore described, the apparatus is mainly intended for use in producing bisulfite of lime, it might obviously be used in any process where a liquid is reduced by the action of a gas which is passed through the said liquid.

We claim—

1. An apparatus for subjecting liquid to the action of gas which comprises a tank; horizontal partitions dividing said tank into compartments one above another, the top and bottom of said tank and each partition in said tank being provided each with an opening to constitute a gas-passage, those of said openings which are below the top of said tank being in substantial alinement with each other; a mechanically-operated distributing device in each compartment and situated over the opening in the bottom of said compartment to distribute the gas entering through said opening; a shaft extending through the openings for gas which are below the top of said tank to operate said several distributing devices; a duct or conduit for the ingress of liquid into the top compartment; conduits connecting each compartment with the compartment next below and constituting a passage for liquid, the upper end of each conduit for liquid being above the inlet-orifice of the opening for gas in the bottom of the compartment from which said conduit for liquid leads; and an outlet for liquid from the bottom compartment, substantially as described.

2. An apparatus for subjecting liquor to the action of gas, which comprises a tank; horizontal partitions dividing said tank into compartments one above another, the top and bottom of said tank and each partition in said tank being provided each with an opening to constitute a gas-passage, those of said openings which are below the top of said tank being in substantial alinement with each other; a mechanically-operated distributing device in each compartment and situated over the opening in the bottom of said compartment to distribute the gas entering through said opening; an agitating device in each compartment; a shaft extending through the openings for gas which are below the top of said tank to operate said several distributing and agitating devices; a duct or conduit for the ingress of liquid to the top compartment; conduits connecting each compartment with the compartment next below and constituting a passage for liquid, the upper end of each conduit for liquid being above the inlet-orifice of the opening for gas in the bottom of the compartment from which said conduit for liquid leads; and an outlet for liquid from the bottom compartment, substantially as described.

3. An apparatus for subjecting liquid to the action of gas, which comprises a tank; horizontal partitions dividing said tank into compartments one above another; the top and bottom of said tank and each partition in said tank being provided each with an opening to constitute a gas-passage, those of said openings which are below the top of said tank being in substantial alinement with each other; a tube constituting a gas-passage projecting upward into each compartment from the opening for gas in the bottom thereof; a mechanically-operated distributing device in each compartment and situated over said tube therein; an agitating device located below the distributing device in each compartment for producing upward local currents in the liquid; a shaft extending through the openings for gas which are below the top of said tank to operate said several distributing and agitating devices; a duct or conduit for the ingress of liquid to the top compartment; conduits connecting each compartment with the compartment next below and constituting a passage for liquid, the upper end of each conduit for liquid being above the inlet-orifice of the opening for the gas in the bottom of the compartment from which said conduit for liquid leads; and an outlet for liquid from the bottom compartment, substantially as described.

4. An apparatus for subjecting liquid to the action of gas which comprises a tank; horizontal partitions dividing said tank into compartments, each partition being provided with an opening to constitute a gas-passage, said openings being in alinement with each other; a mechanically-operated distributing device over each opening to distribute the gas entering through the said opening; a shaft extending through all the said openings to operate said several distributing devices; and conduits connecting each compartment with the compartment next below and constituting a passage for liquid, the ingress end of each conduit being above the inlet-orifice of the opening in the bottom of the compartment from which said conduit leads.

5. An apparatus for subjecting liquid to the action of gas comprising a tank provided with compartments, one above another; a tubular conduit for the ingress of gas projecting upward into each compartment; a duct or conduit for the ingress of liquid to each compartment; an overflow or outlet duct for the egress of liquid from each compartment, the upper end of the tubular conduit for the ingress of gas being substantially below the overflow-duct for the liquid; and a distributing device for the gas also below the overflow-duct for the liquid, as set forth.

6. An apparatus for subjecting liquid to the action of gas comprising a tank provided with compartments, one above another; a tubular conduit for the ingress of gas projecting upward into each compartment; a duct or conduit for the ingress of liquid to each compartment; an overflow or outlet duct for the egress of liquid from each compartment, the upper end of the tubular conduit for the ingress of gas being substantially below the overflow-duct for the liquid; a distributing device for the gas also below the overflow-duct for the liquid; and means for producing upward currents of liquid toward said distributing device, as set forth.

7. An apparatus for subjecting liquid to the action of gas which comprises a receptacle for the liquid, provided with a conduit for the egress of the liquid; a conduit for the ingress of gas below the conduit for the egress of the liquid but above the bottom of the receptacle; a duct or conduit for the egress of gas above the conduit for the egress of liquid; and means for producing upward currents of liquid, said means being located below the inlet end of the said conduit for the ingress of gas, substantially as described.

8. The herein-described apparatus for subjecting a liquid to the action of a gas which comprises a single tank divided by horizontal walls into compartments one above another; means for supplying said compartments with liquid; a tube or conduit for the ingress of gas projecting upward into each compartment; an overflow-conduit for the liquid above the upper end of said tube; a distributing device for the gas above each tube and below each overflow-conduit for the liquid; agitating devices projecting downward below the end of each tube toward the bottom of the compartment and arranged to produce upward currents of liquid; and a conduit for the egress of gas from each compartment, substantially as described.

9. The herein-described apparatus for subjecting liquid to the action of gas which comprises a tank divided horizontally into compartments; a tubular conduit projecting upward into each compartment the conduits and compartments thus constituting a continuous passage through the tank; a conduit or duct leading to the uppermost compartment for the admission of liquid thereto; a conduit or duct leading from each compartment to the compartment next below for the transmission of liquid through the tank, the inlet end of each of said ducts being substantially above the tubular upwardly-projecting conduit in the same compartment; a distributing device in each compartment comprising a rotatable dome having radial tubular arms, said dome being situated over the upwardly-projecting conduit; means for rotating said distributing device; and inclined blades or paddles rotatable with said distributing device to produce upward currents of liquid, as set forth.

10. The herein-described apparatus for subjecting liquid to the action of gas which comprises the tank $a$; the dividing-walls $a^2$ provided with openings for the passage of gas; a distributing device located above each opening and comprising a dome $m$ and radial pipes $m^2$; a vertical rotatable shaft to which said distributing devices are connected; the overflow-pipes $h$, $i$ and $k$; and the conduits $c$, $c^2$ and $c^3$ communicating therewith and located substantially above the openings in the dividing-walls which form the bottoms of the chambers from which said overflow-pipes lead respectively, as set forth.

In testimony whereof we have signed our names to this specification in the presence of two subscribing witnesses.

THEODORE P. BURGESS.
GEORGE E. BURGESS.

Witnesses:
B. N. HANSON,
D. J. RYTHER.